Figure 1:
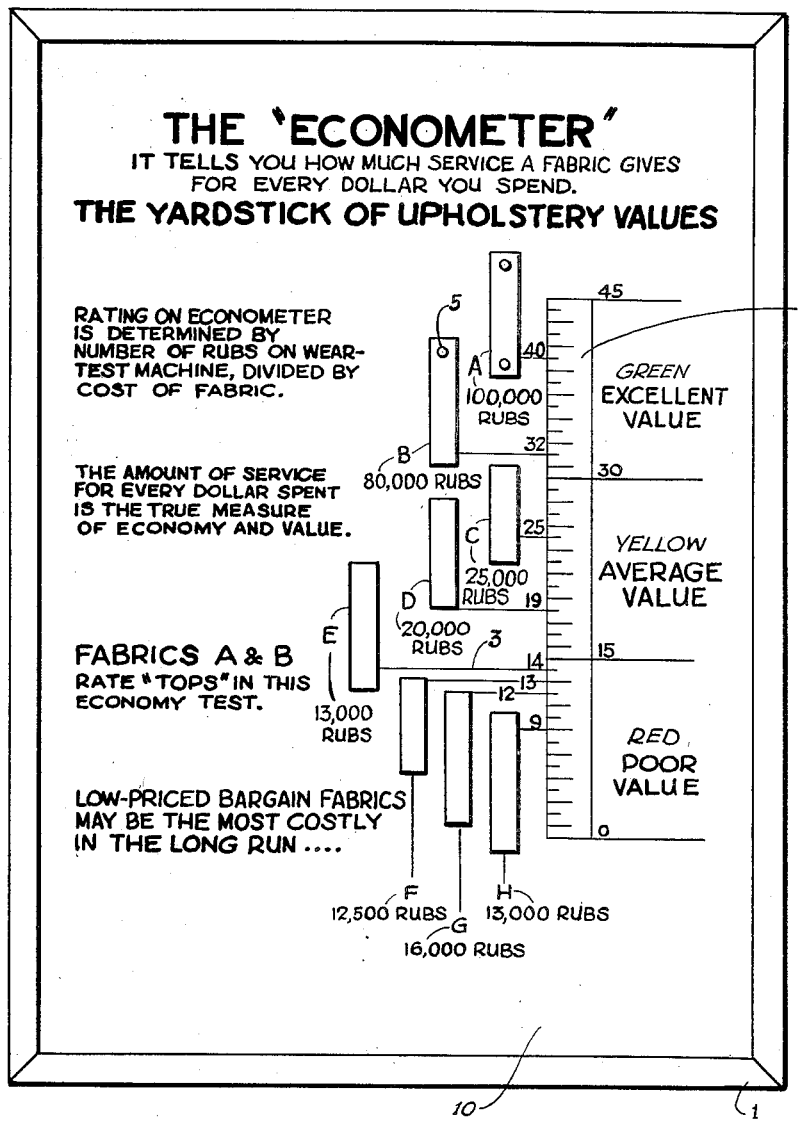
Figure 2:
Figures 3, 4:
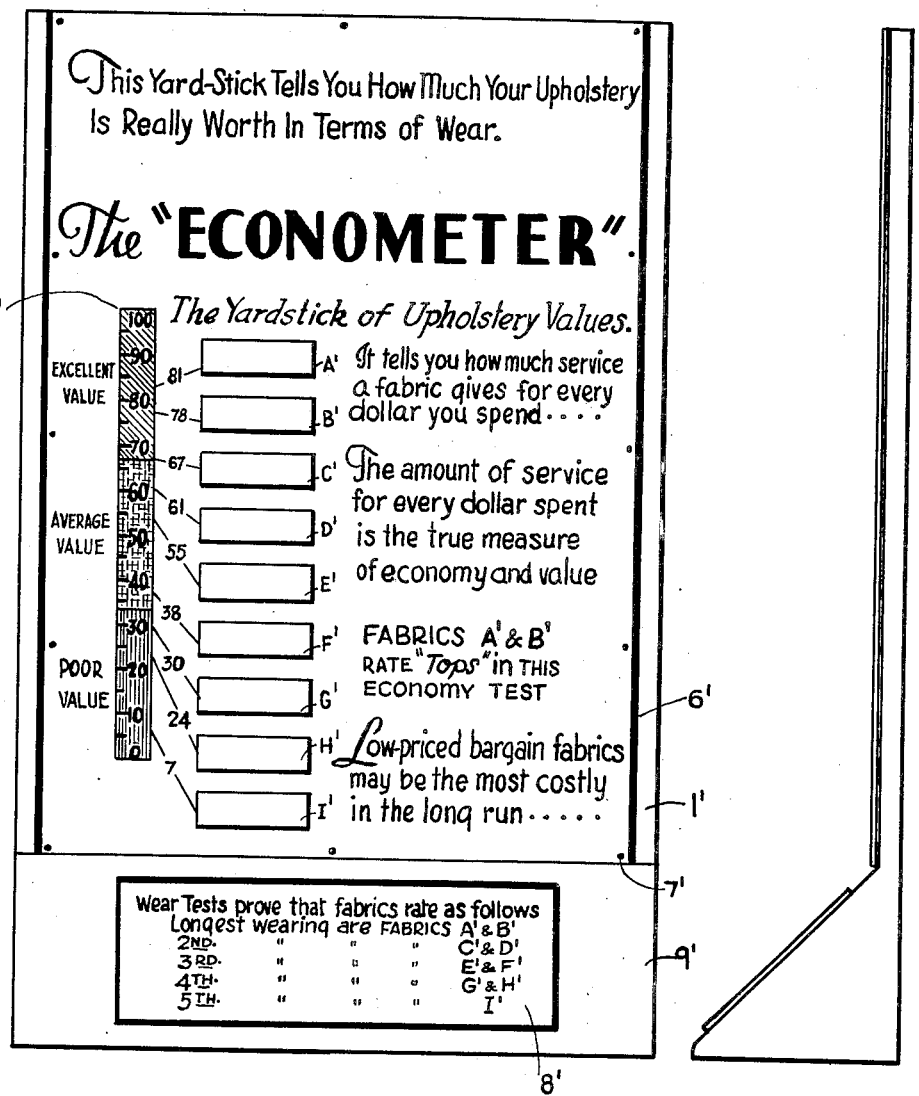

April 13, 1937.  C. L. CONLEY  2,077,214
ECONOMETER DISPLAY BOARD FOR DEMONSTRATING CERTAIN ECONOMIC FACTS
Filed Feb. 13, 1936  2 Sheets-Sheet 1

Inventor.
Charles Larrowe Conley
By Paul J. Schmitz
Attorney.

April 13, 1937.  C. L. CONLEY  2,077,214
ECONOMETER DISPLAY BOARD FOR DEMONSTRATING CERTAIN ECONOMIC FACTS
Filed Feb. 13, 1936  2 Sheets-Sheet 2

Inventor.
Charles Larrowe Conley
By Paul J. Schmitz
Attorney.

Patented Apr. 13, 1937

2,077,214

UNITED STATES PATENT OFFICE 2,077,214

ECONOMETER DISPLAY BOARD FOR DEMONSTRATING CERTAIN ECONOMIC FACTS

Charles Larrowe Conley, Cohocton, N. Y., assignor to Collins & Aikman Corporation, Philadelphia, Pa., a corporation of Delaware Application February 13, 1936, Serial No. 63,807

7 Claims. (Cl. 35—24)

This invention relates to an article of manufacture to be used for educational demonstration. Its primary function is to serve as an educating medium, in the field of economics, for classroom work or for the buying public and to emphasize that in certain cases, low price and good value are not economically concomitant.

It is the object of this invention then to set forth an article of manufacture which may be used to demonstrate certain economic facts.

It is a more specific object of this invention to provide simple and effective means for demonstrating relative economic values of commercial products based on their respective purchase price paid by the consumer.

It is a further object of this invention to provide a compact and a simple article of manufacture, inexpensive to make and simple to use, whereby relatively light objects, such as upholstery or other fabrics, may be inter-compared on the basis of wear, utility, value and price.

Other objects and advantages will be manifest from the following description of the attached drawings in which:

Figure I is a front view of a specific application of my invention.

Figure II is a side elevation of Figure I.

Figure III illustrates a modified form of my invention.

Figure IV is a side view of Figure III.

Applicant's device, as depicted in Figures I and II, comprises a foundation board 10 which may or may not have a border such as a frame 1. The foundation board may be made of wood, preferably naturally or artificially made light in color, or from various grades of paper products. The color of the board is preferably selected for its contrasting effect with the merchandise and information positioned thereupon.

A scale 2 is drawn or mounted on the board and is graduated and divided into three portions, of 15 equal graduations, each depicted as "excellent value", "average value" and "poor value" as shown in Figure I. The words, "green", "yellow" and "red" appearing in Figure I represent a signal or identifying system for the student or purchaser. The green color indicates that the buyer may proceed with confidence. The yellow portion of the scale is an indication that caution should be exercised, whereas the red portion indicates economic danger ahead. The means for dividing the scale may be merely lines drawn on the foundation board for that purpose or the scale itself may be colored in the manner above indicated.

Samples of merchandise, A—H, are secured by clips 5 or a mucilaginous substance or may be fitted into indentations or perforations in the board. If desired, the samples may be fixed to the foundation board at one end only so that they may be easily handled by the buyer. The merchandise is mounted according to its economic rating and value indicating lines, or leaders 3 are drawn from the different samples to their corresponding positions on the scale. A thread or string may be used as a leader. These leaders may be marked with the proper value rating numeral. The economic value rating in the case of upholstery fabrics is determined by certain standard tests, for example, the number of rubs on a wear test machine divided by the cost of a unit of a fabric. This unit may be large or small but of course must be the same for each sample. If, for example, the unit be 1000 yards and the price of sample A be $2.50 per yard, the number 2500 will be the divisor for the number of rubs applied to fabric A. As sample A was subjected to 100,000 rubs on the standard wear test machine, its rating on the value scale will be 40, which is excellent. It is thus made clear to the student or buyer that neither the cost of the fabric nor resistance to abrasion as measured on the wear test machine, wholly determine the position of the merchandise on the value yardstick. It is preferable that the condition of the different samples, after the wear test, be substantially similar as this gives a true picture of their economic worth.

Figure III as indicated above depicts a modification of my invention and shows the invention adapted to the comparison of fabrics of different types. The weave or interlacing of threads would, of course, be a factor. A self-supporting frame 1' serves as a stand for the foundation board 10' which may be attached in any approved manner as by strips 6 and screws 7. The scale 2' is graduated and marked from 0 to 100 and is colored green, yellow and red as indicated on the drawings.

Samples of merchandise, A'—I', are secured in superposed position and have indicating means drawn to the value scale. As in Figure I, the scale is of a range that the price of a unit of the merchandise divided by the highest standard attained by the class of merchandise gives the highest position on the scale. The 0 position indicates no economic value. In the case of fabrics, this standard may be the maximum number of rubs the best class of fabrics will stand.

A legend 8 may be mounted on the base portion 9' of the frame 1' to record the data illustrated on the foundation board. It is obvious that other forms of self-supporting frames and collapsible foundation boards may be used.

In some cases, however, only some of the fabric samples may be exposed to the test to substantially their point of failure. In such cases, the demonstrator may point out that the position of such fabric samples on the value scale is higher than it should be but that even such a favorable position is insufficient to rate the fabric as either excellent or even average value. Generally speaking, if this method is resorted to, the fabric samples given a high value rating should be, after testing, in better condition than those lower on the value scale. Additional explanatory matter as indicated on the drawings may be written or printed on the foundation board.

The econometer accordingly is a means for impressing economic truth in the class-room and is invaluable as a guide to the buying public. It furthermore may be used as a curb to inferior merchandise flooding and dominating the market at the expense of quality manufacturers and the buying public. Applicant does not wish to be limited to the specific embodiment herein set forth but claims and believes to be new the subject matter hereinafter set forth in the attached claims.

Having described my invention, I claim:

1. As an article of manufacture, a foundation board, articles of merchandise mounted on the board, said board having a value scale thereon divided into economic classified groups, said scale being of sufficient range to enable an observer to compare the values of the merchandise, and means leading from the articles to predetermined positions on the value scale for indicating on the value scale the relative values of the wear tested merchandise.

2. As an article of manufacture, a foundation board, articles of wear tested merchandise mounted on the board, said board having a value scale thereon divided into economic classified groups, said scale being of sufficient range to enable an observer to compare the values of the wear tested merchandise mounted on the board, and leaders from the merchandise to mathematically determined positions on the value scale.

3. As an article of manufacture, a foundation board, fabric samples secured to the board, said board having a graduated scale thereon, divided into economic classified groups, said scale being of sufficient range to enable an observer to compare the values of the fabrics secured to the board, means leading from the samples to predetermined positions on the value scale for indicating the relative values of the fabric samples, whereby the true economic worth of the fabric is demonstrated.

4. As an article of manufacture, a foundation board, rub tested fabric samples secured to said foundation board, said board having a graduated scale thereon divided into identified economic classified groups, said scale being of sufficient range to enable an observer to compare the values of the rub tested fabric samples, leaders from said samples to positions on the value scale which have been determined by the number of rubs to which the samples have been subjected, divided by a unit of cost of the fabric.

5. As an article of manufacture, a foundation board, rub tested fabric samples secured to said foundation board, said board having a graduated scale thereon divided into identified economic classified groups, said scale being of sufficient range to enable an observer to compare the values of the rub tested fabric samples, which values have been determined by the number of rubs to which the samples have been subjected, divided by a unit of cost of the fabric, leaders from said samples to positions on the value scale which have been determined by the number of rubs to which the fabric samples have been subjected, divided by a unit of cost of the fabric.

6. As an article of manufacture, a self-supporting frame, a foundation board mounted thereon, rub tested fabric samples secured to said foundation board, said board having a graduated scale thereon divided into identified economic classified groups, said scale being of sufficient range to enable an observer to compare the values of the rub tested fabric samples, a legend secured to the frame to record the data illustrated on the foundation board, leaders from said samples to positions on the value scale which have been determined by the number of rubs to which the samples have been subjected, divided by a unit of cost of the fabric.

7. As an article of manufacture, a foundation board with explanatory matter thereon, rub tested fabric samples secured to said foundation board, said board having a graduated scale divided into identified economic classified groups, said scale being of sufficient range to enable an observer to compare the values of the rub tested fabric samples, the condition of the samples having the higher ratings being equal to or better than that of the remaining samples, leaders from said samples to positions on the value scale which have been determined by the number of rubs to which the fabric samples have been subjected, divided by a unit of cost of the fabric.

CHARLES LARROWE CONLEY.